United States Patent [19]

Brigham et al.

[11] Patent Number: 4,685,292

[45] Date of Patent: Aug. 11, 1987

[54] EXHAUST COOLING SYSTEM FOR INTERNAL COMBUSTION ENGINE

[75] Inventors: William D. Brigham, Huntington Beach; Dinh Nguyen, Orange City, both of Calif.

[73] Assignee: Zwick Energy Research Organization, Inc., Huntington Beach, Calif.

[21] Appl. No.: 774,045

[22] Filed: Sep. 9, 1985

[51] Int. Cl.⁴ ............................................. F01N 3/02
[52] U.S. Cl. .................................... 60/320; 165/159; 165/175; 165/179
[58] Field of Search .................. 60/320, 311; 165/175, 165/179, 159

[56] References Cited

U.S. PATENT DOCUMENTS

| | | | |
|---|---|---|---|
| 1,614,159 | 1/1927 | Smith | 165/175 |
| 2,580,715 | 1/1952 | Baber | 165/175 |
| 2,772,537 | 12/1956 | Lisciani | 60/311 |
| 3,105,708 | 10/1963 | Esty | 60/320 |
| 3,669,185 | 6/1972 | Bare | 165/175 |
| 3,779,312 | 12/1973 | Withers | 165/179 |
| 3,798,904 | 3/1974 | Gleason | 60/320 |
| 4,132,264 | 1/1979 | Furlong | 165/179 |

FOREIGN PATENT DOCUMENTS

| | | | |
|---|---|---|---|
| 329318 | 11/1920 | Fed. Rep. of Germany | 60/320 |
| 2093119 | 8/1982 | United Kingdom | 60/311 |

Primary Examiner—Douglas Hart
Attorney, Agent, or Firm—Beehler, Pavitt, Siegemund, Jagger, Martella, & Dawes

[57] ABSTRACT

A cooling system for engine exhaust gases includes a engine block mounted exhaust manifold connected to a heat exchanger by a conduit and gas distribution header, the exhaust manifold, conduit and distribution header being continuously water jacketed to shield all hot exhaust system surfaces for engine operation in flammable or explosive environments. The exhaust gas flows through parallel gas tubes in the heat exchanger having thin, corrugated walls which aid heat transfer to the surrounding water and are axially expandable to relief thermal stress.

17 Claims, 6 Drawing Figures

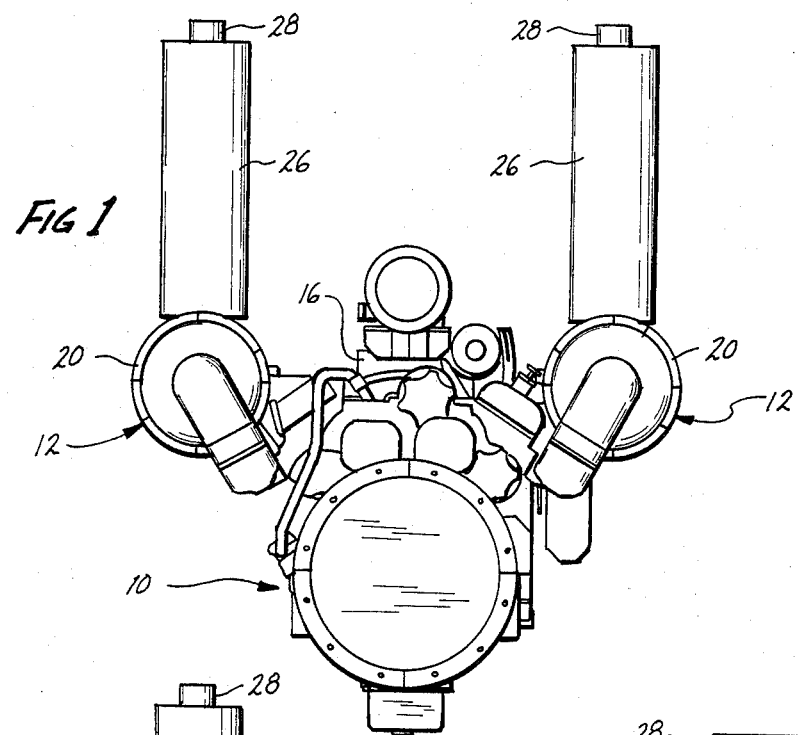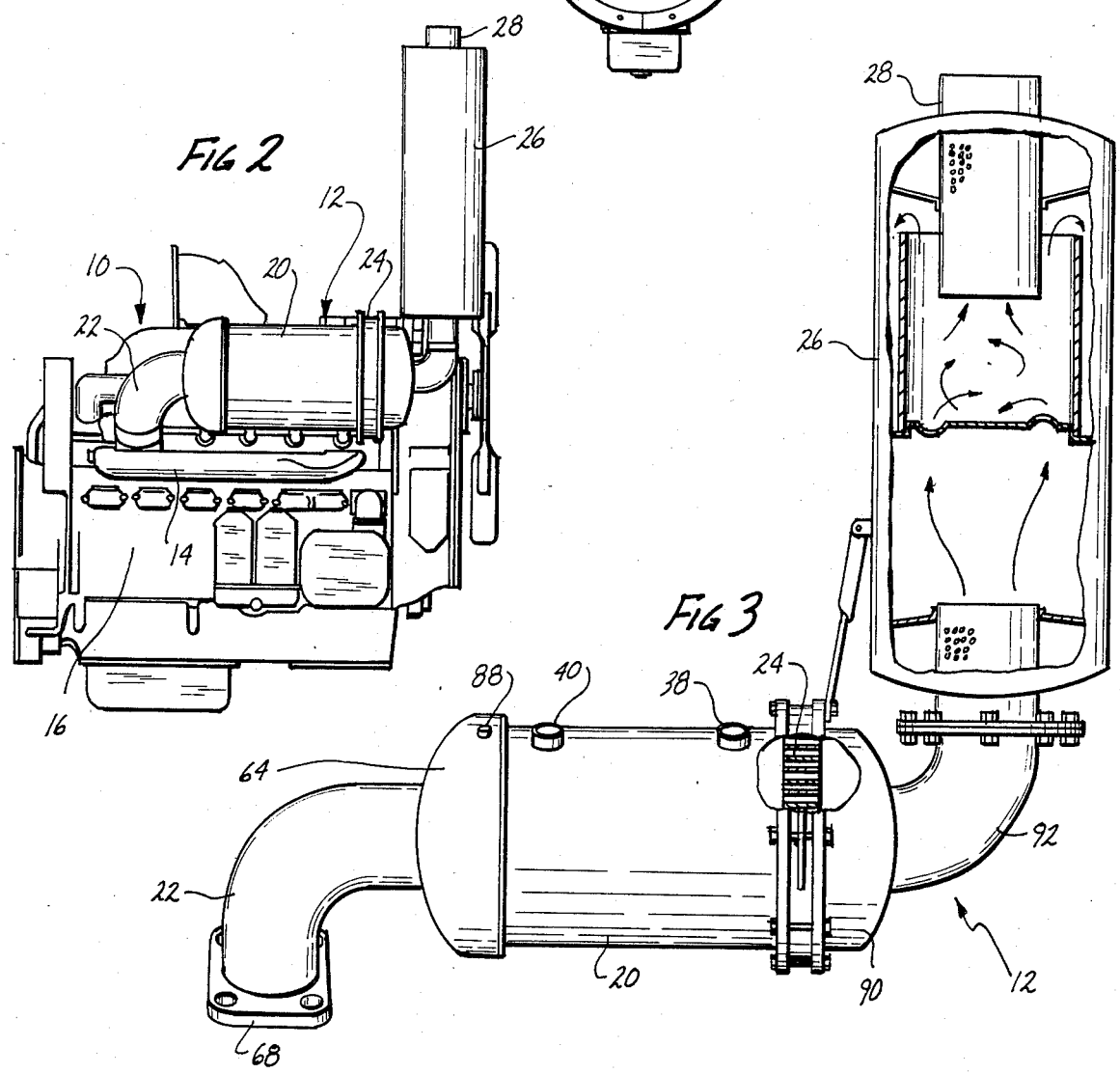

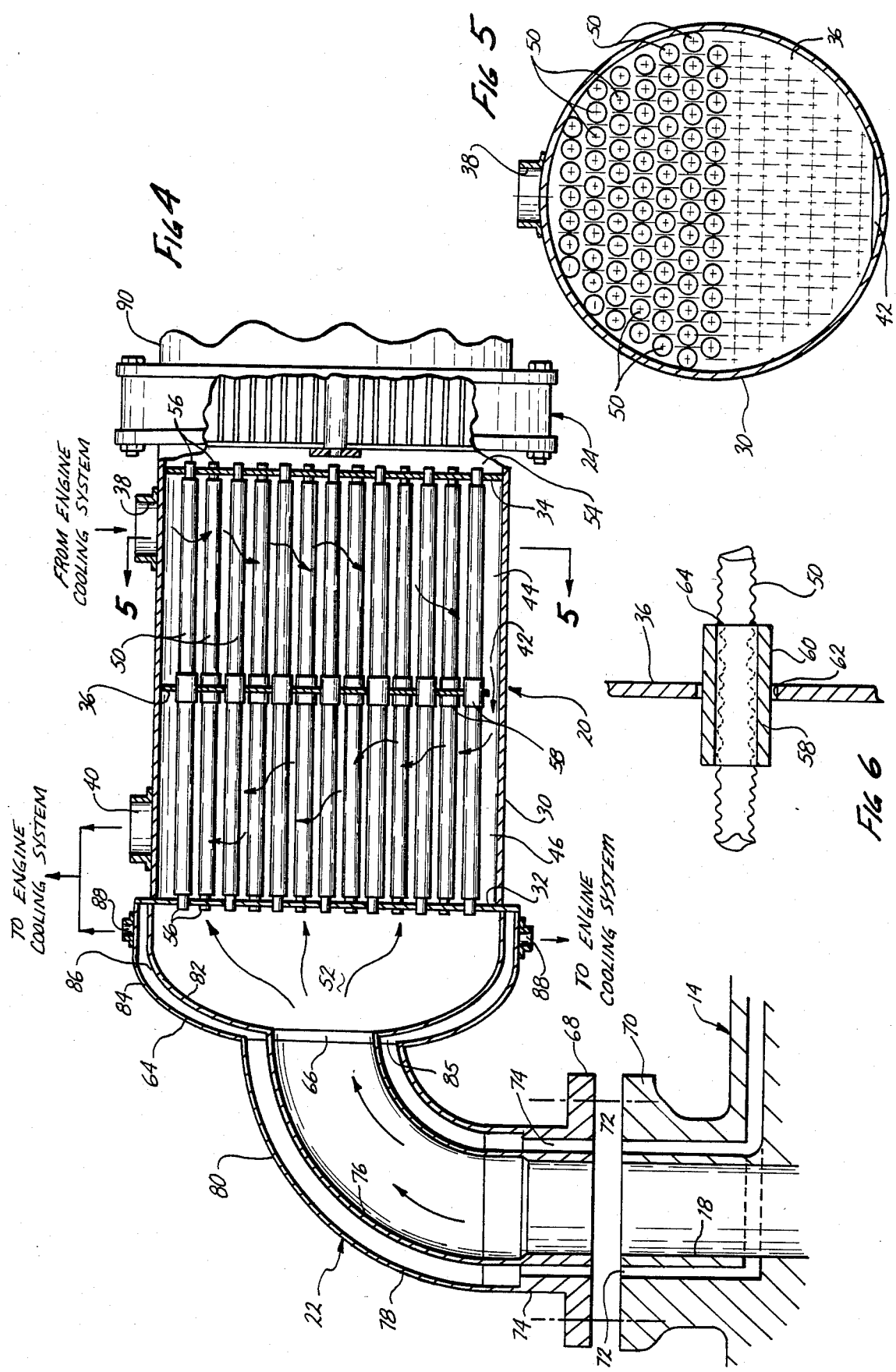

EXHAUST COOLING SYSTEM FOR INTERNAL COMBUSTION ENGINE

BACKGROUND OF THE INVENTION

1. Field of the Invention

The present invention pertains generally to the field of exhaust systems for internal combustion engines, and is more particularly directed to a system for cooling the exhaust conduits and exhaust gases of an internal combustion engine.

2. State of the Prior Art

Internal combustion engines and particularly Diesel engines are used as power plants or prime movers in environments where highly flammable or explosive materials are handled, such as oil and gas drilling sites and well-heads. An engine operating unprotected in such an environment can present exposed surfaces heated to well in excess of 900 degrees Fahrenheit, creating a fire hazard in the event that flammable material should come into contact with hot engine surfaces. This problem is particularly acute in ocean floor drilling platforms where a limited amount of platform space brings engines into close proximity to the oil and gas conduits. Leaks and spills of greater or lesser magnitude are inevitable and in such a congested operating environment it has been found highly desirable to protect hot engine surfaces against contact with flammable materials. Of particular concern in this respect are the exposed surfaces associated with the engine exhaust, including the exhaust manifold through which flow the gases resulting from fuel combustion in the engine cylinders, since Diesel engine exhaust gases typically range between 800 and 1000 degrees F. A maximum allowable temperature of 200 degrees Centigrade (392 F.) for exposed engine surfaces has been adopted as an industry standard for North Sea installations. Of further concern are spark emissions, particularly from Diesel engines which have a propensity for discharging incandescent particles resulting from incomplete fuel combustion, and the possibility of flash-back of flammable gases entering the hot exhaust conduits, even after the engine has been shut down.

The problems of spark emissions and flashback have been dealt with in the past by means of spark arresters and flame arresters, respectively. Both types of devices are in wide use and are commercially available in a variety of designs.

The problem of cooling the engine surfaces associated with gas exhaust conduits has also been addressed in the past. One exhaust cooling system, which is commercially available and specifically intended to meet the requirements of the oil industry in ocean based platforms, makes use of large water jackets fabricated from sheet metal and bolted over the standard engine exhaust manifolds. A tube provided with its own, separate water jacket carries the hot gases from the manifold into a heat exchanger consisting of a relatively large gas chamber through which extend finned water carrying tubes which absorb heat from the exhaust gases. The gas chamber is itself enclosed in a water jacket in order to maintain its outer surfaces below the maximum permissible temperature. The cooled exhaust gas is then circulated through a flame arrester and a spark arrester and then discharged to the atmosphere. This cooling apparatus is bulky and inordinately heavy, in addition to being unnecessarily complex in that cooling water from the engine cooling system must be directed through three separate water jackets in addition to the cooling tubes in the heat exchanger by means of external tubing provided for this purpose.

This existing cooling system is reasonably effective in protecting hot engine surfaces as well as cooling the exhaust gases, but is unnecessarily complex, heavy and costly, and further improvement thereon is desirable.

SUMMARY OF THE INVENTION

The invention disclosed herein is an improved, more compact and light-weight engine exhaust cooling system than has been available in the past. The system makes use of a commercially available cast iron exhaust manifold unit with integral water jacket which, therefore, does not require a separate, exterior water jacket envelope but instead provides water passages formed in the exhaust manifold unit itself. This compact unit bolts directly onto the engine block as a direct replacement for the standard, uncooled exhaust manifold. The water jacket on the manifold primarily serves to provide a cooler manifold surface but does not significantly reduce the temperature of the exhaust gases themselves.

The system further includes a heat exchanger consisting of a vessel through which extend a relatively large number of mutually parallel gas tubes. The vessel is partitioned by a baffle transverse to the gas tubes into a first and a second section. An inlet port and an outlet port are provided, respectively, in the first and second sections, and an opening is formed in the transverse baffle to permit water flow from one to the other of the two sections. At one end of the heat exchanger vessel is attached an inlet header defining a header cavity for distributing the hot exhaust gases to the inlets of the gas tubes. The header cavity is connected to the gas discharge port of the engine exhaust manifold by means of an inlet conduit. The inlet header as well as the inlet conduit are double-walled to define a water jacket envelope about both the inlet conduit and inlet header so as to maintain relatively cool outer surfaces over those portions of the system. Cooling water is supplied to this water jacket directly from the jacketed manifold. The heat exchanger vessel itself is filled with cooling water circulating through spaces between the parallel gas tubes. The heat exchanger vessel wall does not come into contact with hot exhaust gas and is therefore maintained at a relatively low temperature by the circulating water. The hot gases flow through the gas tubes and are insulated from the heat exchanger vessel wall by the circulating body of water, thus eliminating the need for a separate water jacket over the heat exchanger.

A particularly light-weight and compact heat exchanger unit is achieved by use of thin-walled corrugated tubing for the gas tubes. The corrugated tubing readily flexes and bends in response to mechanical stresses arising from thermal expansion and contraction of the tube material or the heat exchanger vessel. The conventional approach in heat exchanger design has been to utilize rigid, thick-walled tubing capable of withstanding the mechanical stresses resulting from temperature variations. Further, the thin walls of these tubes promote heat exchange between the gas and the water, while the corrugations substantially increase the tube wall surface in contact with both the hot gas and cooling water. The corrugated gas tubes are fixed to the heat exchanger vessel at opposite ends and extend through openings in the transverse baffle, but are axially slidable relative to the fixed baffle so as to allow substantially unhindered expansion, contraction, or flexing of the gas tubes along their full length thereby to prevent stress build-up along the tubes. Such sliding movement is facilitated by a short tubular sleeve affixed over each gas tube and having smooth outer surfaces contacting the baffle. These sleeves cover and protect the thin, corrugated tube surfaces.

The cool exhaust gas flowing out of the gas tubes are passed through conventional flame and spark arrester units mounted to the gas exhaust end of the heat exchanger vessel, from where the cooled exhaust gases are discharged to the atmosphere.

BRIEF DESCRIPTION OF THE DRAWINGS

FIG. 1 is an end elevational view of a typical Diesel engine provided with the exhaust cooling system of this invention.

FIG. 2 is a side elevational view of the engine of FIG. 1.

FIG. 3 is a side elevational view of the heat exchanger, spark and flame arrester assembly of the novel cooling system.

FIG. 4 is a longitudinal section of the novel heat exchanger with the flame arrester mounted thereto, and also showing a portion of the water jacketed exhaust manifold.

FIG. 5 is a transverse section of the heat exchanger taken along line 5—5 in FIG. 4.

FIG. 6 is a detail view enlarged to show the protective sleeve over a corrugated gas tube extending through the transverse baffle.

DETAILED DESCRIPTION OF THE DRAWINGS

With reference to the drawings, and FIGS. 1, 2, and 3 in particular, a typical Diesel engine 10 is shown equipped with the exhaust cooling system of this invention. The exhaust cooling system includes two sections 12 which are mirror images of each other but equivalent in function and performance. The two systems 12 are mounted one on each side of the engine 10, one system 12 corresponding to each cylinder bank of the engine. Each cooling system 12 includes an exhaust manifold 14 which is bolted to the engine block 16 in the conventional manner so as to receive the exhaust gases from the cylinders on the corresponding side of the engine, and discharge the exhaust from the particular cylinder bank through a common gas discharge port 18. The configuration of the exhaust manifold 14 is conventional except that it includes water jacket spaces cast integrally as part of the exhaust manifold unit. Such a water jacketed exhaust manifold is a commercially available item and can be readily substituted for the standard exhaust manifold supplied by the engine maker. The cooling system further comprises a novel heat exchanger 20 connected through a conduit 22 to the discharge port 18 of the exhaust manifold 14, as shown in FIG. 4. A flame arrester element 24 is mounted to the discharge end of the heat exchanger 20, and a spark arrester/muffler 26 receives the exhaust gas flow from the flame arrester 24 and discharges the exhaust to the atmosphere through exhaust pipe 28.

Turning to FIG. 4 and 5, the heat exchanger 20 is seen to comprise a cylindrical heat exchanger vessel 30 having an inlet end closed by a first end plate 32 and an outlet end closed by end plate 34. The cylindrical wall of vessel 30 together with circular end plates 32 and 34 define a cylindrical coolant water chambaer which is partitioned into substantially equal sections 44, 46 by a transverse baffle 36. A water inlet port 38 opens into section 44 on one side of the baffle 36, and a water outlet port 40 opens into section 46, on the other side of baffle 36. A portion of the baffle 36 is cut off to define a baffle opening 42 diametrically opposite both of the ports 38, 40 as best seen in FIG. 5. The water inlet port 38 is connected by suitable tubing (not shown) to the output of the water pump in the existing cooling system of engine 10. Water flows through the section 44, passes through the baffle opening 42 into the section 46 and flows out of the heat exchanger vessel through port 40 from where it may be returned to the low pressure side of the engine water pump. A relatively large number of straight gas tubes 50 are supported in mutually parallel relationship between the end plates 32 and 34, and extend fully through the water chamber in an axial direction. Each tube 50 is open at both ends defining gas passages communicating an inlet header cavity 52 with an exhaust chamber 54. Each of the gas tubes 50 has a thin metal corrugated wall as seen in FIG. 6, the corrugations being annular about the circumference of the gas tube. This type of tubing is commercially available from Flex-Weld Inc. 221 S. Main St., Bartlett, Ill. 60103, among other sources and is typically used for making flexible joints between two rigid conduits. The gas tubes 50 are fitted over and welded at each end onto short tubing stubs 56 which extend through the end plates 32, 34. The intermediate portion of each gas tube 50 passes through a corresponding opening in the transverse baffle 36. The outer surface of the gas tubes 50 have circumferential ridges and therefore is not readily slidable axially through a closely fitting opening in the baffle 36. Each tube 50 is therefore provided with a short tubular sleeve 58 which presents a smooth cylindrical outer surface 60 to the circular rim 62 of the baffle opening through which the sleeve extends. the baffle hole 62 is closely sized to the outer dimensions of the sleeve 60 to prevent excessive water flow through the perforated baffle instead of the baffle opening 42. The sleeve 60 is tacked onto its corresponding corrugated gas tube 50 at a single axial location as by welding at 64 in FIG. 6. The sleeve 58 readily slides axially through the opening 62 in baffle 36 as the corrugated gas tube 50 expands, contracts, twists or bends in response to thermally induced mechanical stresses. Each tube 50 is thus fixed only at its ends, and is slidable relative to the baffle 36 so as to allow expansion and contraction of the tube along its full length to minimize stress build-up along the tube. The sleeve 58 also protects the relatively thin wall of each gas tube against damage through impact or abrasion with the rim of its corresponding baffle hole 62. The gas tubes 50 are subject to a temperature gradient which may span 600 degrees F. between the gas inlet and gas outlet ends of the tubes. Further the gas inlet ends may be subject to operating temperatures reaching 1000 degrees F. and subzero ambient temperatures while the system is shut down. The resulting severe expansion and contraction of the heat exchanger components between such temperature extremes has been dealt with in the past by use of helically coiled tubes or the like which can be expanded and compressed along the coil axis. This approach requires longer lengths of tubing and also yields a heavier, bulky heat exchanger assembly. The novel use of flexible corrugated tubing allows the gas tubes 50 to be straight and relatively short without danger of cracking at the weld seams or rupture of the tube wall.

The small thickness of the corrugated walls of the gas tubes 50 promotes the flow of heat from the hot gas flowing through the tube to the body of water surrounding the tube. Furthermore, for a given length of tubing, the corrugations of the tube wall substantially increase the tube surface contacted by both gas and cooling water, further increasing the rate of thermal flow. The improved thermal characteristics of the gas tubing coupled with the relatively short lengths of tubing and the inherent lightweight of the tube stock itself all contribute to produce a heat exchanger which is compact and lightweight without sacrifice in performance.

An inlet header 64 is affixed to the gas inlet end of the heat exchanger vessel 30 as seen in FIGS. 3 and 4. The header 64 is generally dome-shaped and has an opening 66 at its apex to which is connected an elbow shaped gas inlet conduit 22. The distal end of conduit 22 terminates in a connecting flange 68 adapted to mate to a similar flange 70 provided at the gas discharge port 18 of the water jacketed exhaust manifold 14. The exhaust manifold as commercially available has four circularly arcuate water discharge slot openings 72 disposed about a circular gas discharge port 18. The heat exchanger connecting flange 68 has similarly shaped water inlet openings 74 which mate to the water outlet openings 72 when the flanges 68 and 70 are bolted together, as shown in FIG. 4. Both the dome-shaped header 64 and inlet conduit 22 are double-walled to define a continuous water jacket space or envelope about both the inlet conduit 22 and header 64. The elbow conduit 22 includes an inner tube 76 and an outer tube 78 defining an annular water jacket space 80 extending from the inlet openings 74 of flange 68 to the header inlet 66. The header 64 includes an inner header wall 82 which defines the header cavity 52 proper and an outer header wall 84, the two walls 82, 84 being spaced apart to form a dome-like water jacket space 86 which communicates with the inlet conduit water jacket 80 through an annular gap 85 surrounding the header inlet 66. The jacketed manifold includes a water inlet which is connected by suitable tubing to the engine water pump. Engine cooling water flows through the manifold 14 and enters the elbow conduit jacket 80 through inlets 74, then flows through the header jacket 86 and flows out through diametrically opposed outlet ports 88 from where the water is returned to the low pressure side of the water pump of the conventional engine block cooling system of engine 10.

It will be appreciated that the present cooling system protects all surfaces which are normally heated to elevated temperatures by exhaust gases by covering all exhaust conduits including the exhaust manifold 14, elbow 22 and header 64 with a continuous water jacket. The hot exhaust gases are distributed in header cavity 52 among the gas tubes 50. As the exhaust gases flow through the individual tubes 50 they are cooled by heat exchanging contact with the cooling water flowing through the interior of cylindrical vessel 30.

The exhaust gases upon emerging from the tubes 50 into exhaust chamber 54 have been substantially cooled to a temperature below the permissible limit of 200 degrees C., and then flow through a flame arrester element 24 which is a commercially available item consisting of a corrugated metallic ribbon wound into a tight coil such that adjacent turns of the coil define small passages for the exhaust gases. The metallic ribbon of the arrester element cools gas flowing through these passages to such an extent that flame is not transmitted through the coil. A downstream dome 90 is mounted to the exhaust side of the flame arrester 24 for collecting the exhaust gases and directing the flow into conduit 92 which connects the dome 90 to a conventional spark arrester and noise muffler unit 26.

While particular embodiments of the present invention have been shown and illustrated for purposes of clarity, it must be understood that various changes, modifications, and substitutions will become apparent to those possessed of ordinary skill in the art without departing from the spirit and scope of the present invention, which is defined only by the following claims.

What is claimed is:

1. A compact exhaust cooling system for an internal combustion engine comprising:
    an exhaust manifold adapted to be mounted to the engine block of an internal combustion engine for receiving hot exhaust gases therefrom, said manifold having an integral manifold cooling jacket including coolant inlet means and a manifold outlet including one or more coolant discharge ports adjacent a gas discharge port;
    a duct terminating in a gas distribution header, said duct and header being double walled so as to define a continuous cooling jacket fully enveloping both said duct and header, said duct having an inlet end, said inlet end including coolant inlets into said second cooling jacket and a gas inlet to said duct, means for connecting said inlet end to said manifold outlet with said coolant and gas inlets in respective alignment with said coolant and gas outlets such that coolant from said manifold jacket flows through said continuous cooling jacket and returns to the engine through one or more coolant return ports in said header while engine exhaust gas flows from said manifold gas outlet into said duct gas inlet;
    a heat exchanger comprising a vessel having an upstream end, a downstream end and a plurality of gas tubes extending through said vessel between said ends, said tubes open at each said end exteriorly to said vessel, said header being connected to said upstream end for supplying engine exhaust gas to said gas tubes, and means for circulating coolant through the interior of said vessel in heat exchanging contact with said gas tubes for cooling the exhaust gas passing through said gas tubes;
    whereby the hot exterior surfaces of all exhaust gas conduits from said engine block to said downstream end of said heat exchanger are fully and continuously jacketed with circulating coolant and thus effectively shielded against contact with flammable substances in the engine operating environment.

2. The system of claim 1 wherein said duct is rigid and elbow shaped and said header is dome shaped, said elbow connected to the apex of said header dome.

3. The system of claim 1 wherein said means for circulating coolant through said heat exchanger means comprises conduit means connecting said vessel to the conventional coolant system of the internal combustion engine.

4. The system of claim 2 wherein said elbow shaped duct is metallic and comprises an inner tube and an outer tube, said header dome is also metallic and comprises an inner dome and an outer dome, said outer tube connected to the outer dome, said inner tube connected to said inner dome, flange means at the free ends of said duct tubes supporting said tubes in spaced apart relationship, said coolant inlet ducts being defined in said flange for admitting coolant into the space between said tubes.

5. The system of claim 1 wherein said means for connecting comprise a first flange on said manifold outlet and a second flange on said inlet end of said duct, said flanges being apertured to define said gas and coolant inlets and outlets, and fastener means for securing said first and second flanges with said inlets and outlets in respective communicating relationship.

6. The system of claim 1 wherein coolant is circulated through a first coolant circuit delivering coolant to said manifold and returning the coolant from said header, and a second coolant circuit delivering coolant to an inlet in said heat exchanger vessel and returning the coolant from an outlet in said heat exchanger vessel, said first and second circuits being both supplied with coolant from the engine block cooling system.

7. The system of claim 6 further comprising flame arrester means affixed to the downstream end of said heat exchanger vessel for receiving gases discharged by said gas tubes.

8. The system of claim 7 further comprising spark arrester/muffler means connected downstream of said spark arrester for discharging exhaust gases to the atmosphere.

9. The system of claim 7 wherein said flame arrester comprises a length of corrugated metallic tape wound into a coil, the corrugations of adjacent coil turn defining axially oriented gas passages through the flame arrester coil.

10. The system of claim 9 wherein said heat exchanger vessel is cylindrical and said flame arrester coil has a diameter approximately equal to the diameter of said vessel and is mounted coaxially therewith to its downstream end, so as to provide a compact heat exchanger/flame arrester assembly.

11. The system of claim 1 wherein said gas tubes extend through said heat exchanger vessel in mutually spaced straight parallel relationship and are supported between opposite end walls of said vessel by means of weld joints, said gas tubes having axially corrugated thin metal walls adapted for ready axial thermal expansion and contraction without imposing subtantial strain upon said weld joints, whereby relatively short straight lengths of tubing may be reliably welded to to said end walls, said corrugations also increasing the area of heat exchanging contact with coolant in said vessel.

12. The system of claim 11 wherein said heat exchanger vessel further comprises a partition between said end walls apertured for passage of said gas tubes therethrough, a coolant inlet and a coolant outlet on opposite sides of said partition, said partition apertured to define a relatively long coolant flow path between said inlet and outlet, said gas tubes being axially slidably supported by said partition against bending.

13. The system of claim 1 wherein said heat exchanger vessel is cylindrical and said header is dome with a circular rim, said rim fixed against the upstream end of said vessel.

14. A compact exhaust cooling system for an internal combustion engine comprising:
  a unitary exhaust manifold adapted to be mounted to the engine block of an internal combustion engine for receiving hot exhaust gases therefrom, said manifold having an integral manifold cooling jacket including coolant inlet means and a manifold outlet including a gas discharge port encompassed by a flange with one or more coolant discharge ports in said flange;
  an elbow duct having an inner tube and an outer tube connected at an inlet end by an inlet flange, said duct terminating at its opposite end in a circular doomed gas distribution header, said header including an inner dome connected to said inner tube and an outer dome connected to said outer tube so as to define between said inner and outer tubes and domes a continuous elbow cooling jacket fully enveloping said inner tube and said inner dome from said inlet flange to a dome rim connecting said inner and outer domes, said inlet flange having coolant inlets into said elbow cooling jacket in alignment with said manifold coolant outlets such that coolant flows from said manifold jacket flows into said elbow cooling jacket and returns to the engine through one or more coolant return ports in said header near said rim while engine exhaust gas flows from said manifold gas outlet into said inner tube and inner dome;
  a heat exchanger comprising a vessel having an upstream end, a downstream end and plurality of straight mutually parallel gas tubes extending through said vessel and supported by weld joints to said ends, said tubes open at each said end exteriorly to said vessel, said header being connected at said rim to said upstream end for supplying engine exhaust gas to said gas tubes, and means for circulating coolant through the interior of said vessel in heat exchanging contact with said gas tubes for cooling the exhaust gas passing through said gas tubes, said gas tubes having axially corrugated thin metallic walls adapted for ready axial thermal expansion and contraction without placing substantial strain on said weld joints, whereby relatively short straight gas tubes may be reliably welded to said vessel ends;
  and whereby the hot exterior surfaces of all exhaust gas conduits from said engine block to said downstream end of said heat exchanger are fully and continuously jacketed with circulating coolant and thus effectively shielded against contact with flammable substances in the engine operating environment.

15. An exhaust cooling system for an internal combustion engine comprising:
  an exhaust manifold unit adapted for mounting to the engine block of the internal combustion engine for receiving exhaust gases from the engine, said manifold including an integral cooling jacket for cooling the exposed surfaces of said manifold;
  a heat exchanger for cooling exhaust gases from the engine, said heat exchanger characterized by a coolant vessel, gas tubes extending through said vessel for carrying hot gases therethrough from an upstream end to a downstream end in heat exchanging relationship with a coolant medium circulating through said vessel; and
  an intermediate gas conduit connected for carrying hot exhaust gases from said manifold to said heat exchanger, said gas conduit being double walled between said manifold and defining between said walls a continuous cooling jacket fully eneloping said conduit, said conduit connecting to said manifold so as to receive coolant medium from said manifold cooling jacket, whereby all exposed surfaces of said manifold, said intermedite gas conduit, and said heat exchanger are shielded by circulating coolant medium against heat from engine exhaust gases to permit safe engine in proximity to flammable substance.

16. The system of claim 15 further comprising an internal combustion engine including an engine block cooling system and wherein said exhaust manifold, said intermediate gas conduit and said heat exchanger are all supplied with circulating coolant medium from said engine block cooling system, and wherein said intermediate conduit and said heat exchanger vessel are mounted to said engine block whereby a compact engine exhaust cooling is provided.

17. The system of claim 16 further comprising flame arrestor means mounted to said downstream end of said heat exchanger and a spark arrestor/muffler unit connected in operative communicating relationship to said flame arrestor for discharging engine exhaust gases to the atmosphere, said spark arrestor/muffler unit supported by said engine block, whereby a compact self-contained power plant is provided for operation in fire hazardous environments.

* * * * *